March 7, 1961 K. FARRER 2,973,725
SANDWICHING MACHINE
Filed May 26, 1959 3 Sheets-Sheet 1

INVENTOR
Kenneth Farrer
BY Watson, Cole, Grindle & Watson
ATTORNEYS

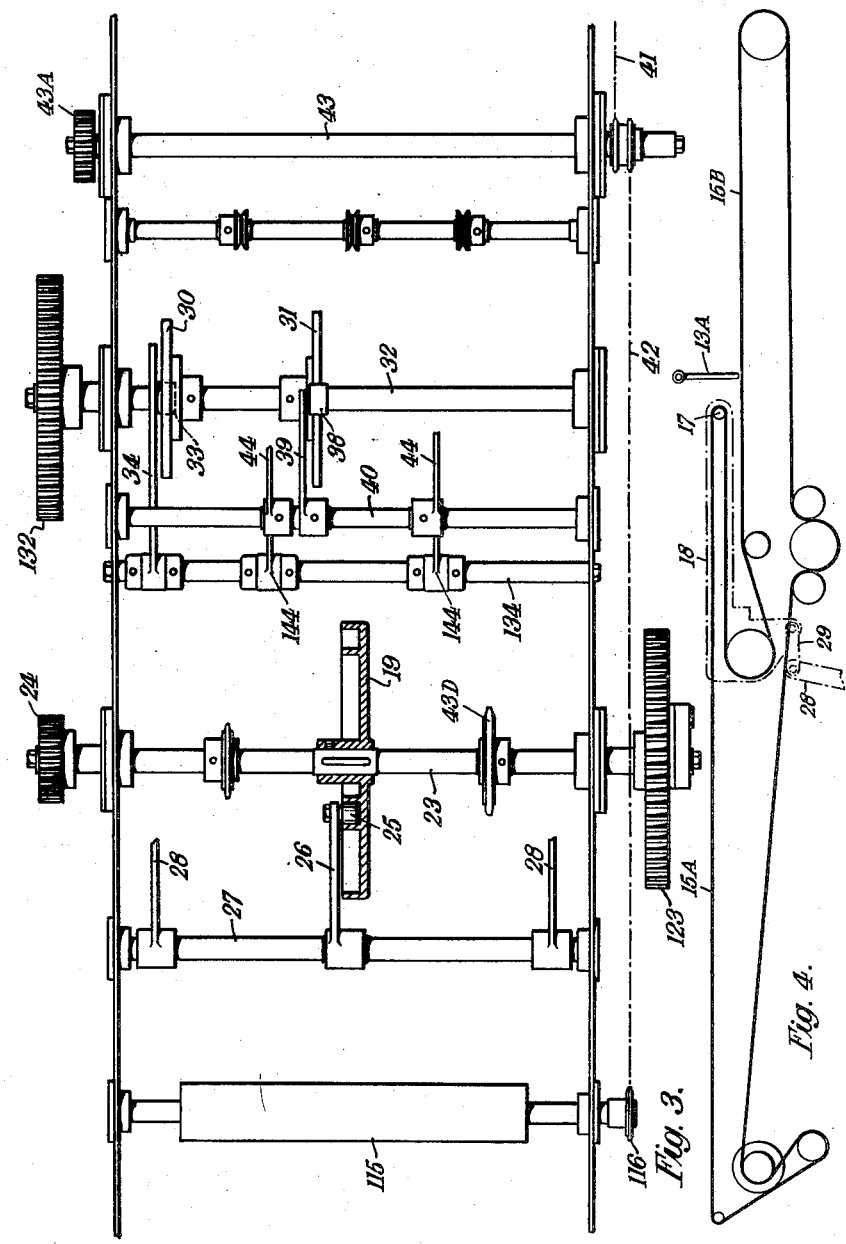

United States Patent Office 2,973,725
Patented Mar. 7, 1961

2,973,725

SANDWICHING MACHINE

Kenneth Farrer, Stamford, England, assignor to Baker Perkins Limited, Peterborough, Northants, England, a company of Great Britain Filed May 26, 1959, Ser. No. 815,910

Claims priority, application Great Britain May 27, 1958

9 Claims. (Cl. 107—1)

In United States Patent No. 2,838,010 I have described a machine for producing sandwiches consisting of layers of wafer sheets, biscuits or the like, hereinafter termed wafer sheets, with intervening layers of cream or other filling material, comprising a conveyor for feeding creamed wafer sheets, with their creamed surfaces uppermost, successively into position against a stop, means for periodically lifting arrested wafer sheets from the conveyor and afterwards allowing the lifted wafer sheets to descend into position on top of another arrested wafer sheet, thereby forming a sandwich of superposed creamed wafer sheets in front of the stop, mechanism for incorporating at the top of each sandwich a single dry wafer sheet, and means for periodically withdrawing the stop to permit the conveyor to feed completed wafer sandwiches forward. The machine can be adjusted so that one, two, three or more creamed wafer sheets are incorporated, with the single dry wafer sheet, in the sandwich.

The object of the present invention is to provide a modified form of wafer sandwiching machine which is simpler and less expensive, which will handle the wafer sheets more gently, and which is nevertheless capable of a greater output.

The invention provides a machine for producing sandwiches consisting of layers of wafer sheets, biscuits or the like with intervening layers of cream or other filling material, comprising continuously travelling conveyor mechanism including upper and lower sections, stop mechanism having vertically aligned upper and lower portions, the upper portion of the stop mechanism serving to arrest in succession creamed wafer sheets fed thereto, with their creamed surface uppermost, by the upper section of the conveyor mechanism, mechanism for periodically retracting the delivery end of the upper section of the conveyor mechanism to cause the arrested sheets to fall in succession on to the lower section thereof, the lower portion of the stop mechanism serving to arrest the sheets so deposited, means operative whenever a predetermined number of creamed sheets has been arrested by the upper portion of the stop mechanism to deposit a dry wafer sheet on top of the creamed sheets to form a sandwich, and means for thereafter withdrawing the lower portion of the stop mechanism to allow the lower section of the conveyor mechanism to feed the sandwich forward.

As explained in more detail later, the two sections of the conveyor mechanism may be constituted by separate conveyors or by portions, situated at different levels, of the upper run of a single conveyor. Also the two portions of the stop mechanism may be constituted by separate fixed and movable stops or may be constituted by parts of a single stop which can be periodically lifted to an extent sufficient only to allow of forward feed of the sandwiches on the lower section of the conveyor mechanism.

Preferably the machine includes means for supporting dry wafer sheets in position above the arrested creamed sheets, a conveyor for supplying dry wafer sheets in succession to the supporting means and mechanism operative while the upper section of the conveyor mechanism is not retracted for moving the supporting means to an inoperative position to allow a dry wafer sheet to descend upon the last arrested creamed sheet.

The machine can be arranged, as described in more detail later, to produce sandwiches consisting of two, three or more wafer sheets by appropriate adjustment of the timing of the mechanism for delivering dry wafer sheets and withdrawing the lower portion of the stop mechanism in relation to the mechanism for retracting the upper section of the conveyor mechanism.

Two specific embodiments of wafer sandwiching machine according to the invention will now be described in more detail, by way of example, with reference to the drawings, in which:

Fig. 3 is an expanded sectional plan view showing the two cam shafts and certain other parts, and Fig. 4 is a diagram showing the second form of machine.

Figure 1:
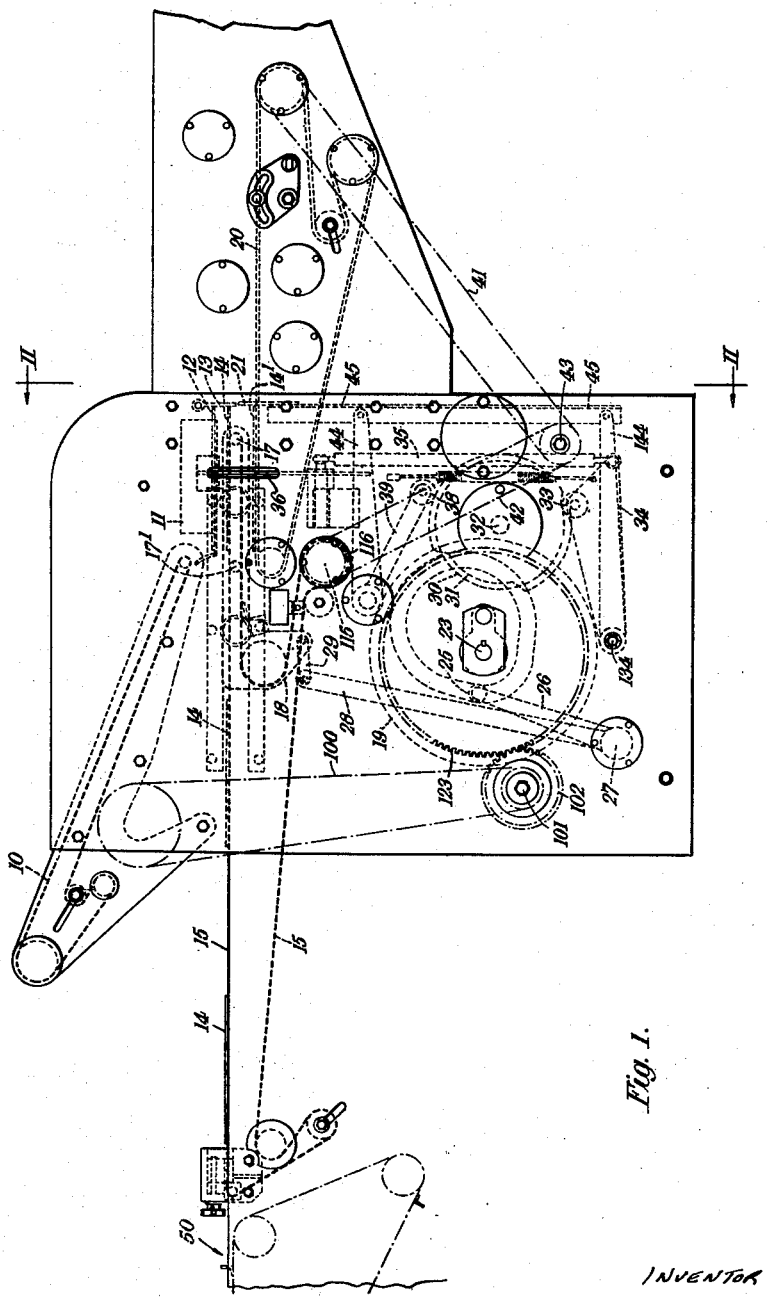
Fig. 1 is a side elevation of the first form of machine.
Figure 2:
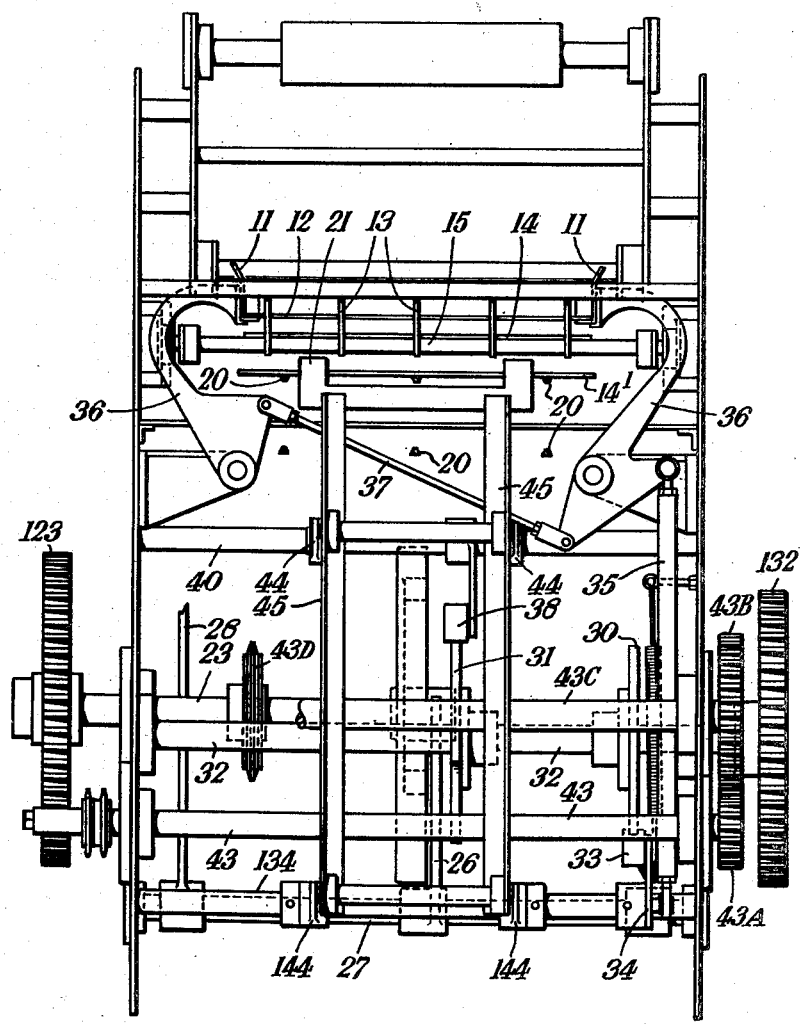
Fig. 2 is a section on the line II—II in Fig. 1.

The machine of Figs. 1–3 is shown organized to produce 4-wafer sandwiches, constituted by three creamed wafer sheets and a single dry wafer sheet at the top of the sandwich. Preparatory to arrival at the sandwiching machine the wafer sheets pass through a selecting and marshalling unit 50 of the kind described in United States Patent No. 2,884,115. Dry wafer sheets are fed in succession from the selecting conveyor of this unit and by a conveyor 10 to a pair of relatively movable trays 11 which, initially, support the edges of the dry wafer sheet 12 as shown most clearly in Fig. 2. Said trays 11 are supported on pivoted brackets 36 which are actuable as later described to move the trays 11 to a position in which they release the sheet 12. The conveyor 10 is driven by a chain 100 from a drive shaft 101 driven from the marshalling unit and carrying a gear 102 meshing with a gear 123 on a main cam shaft 23.

A fixed stop, constituted by a number of upstanding fingers 13, serves to arrest the dry wafer sheet 12 delivered to the trays 11. After marshalling, and passage through a spreading machine, the creamed wafer sheets 14 are fed in succession, creamed surface uppermost, to the stop fingers 13 by a conveyor belt 15 passing at the end nearer the stop fingers 13 around a roller 17 mounted on a reciprocable carriage 18. The carriage 18 is slidably mounted on horizontal guides (not shown). The creamed wafer sheets 14 are spaced uniformly on the conveyor belt 15. At a time interval of ⅓ second after the leading edge of the first creamed wafer sheet has been arrested by the stop fingers 13, a cam 19 causes, as later described, the carriage 18 to retract, bringing its roller 17 to the position indicated at 17′ and thereby removing the support of the belt 15 from the arrested wafer sheet, which drops on to a conveyor 20, being arrested by a stop 21 aligned vertically with the stop 13. The conveyor 20 comprises three V belts and, as will be seen from Fig. 2, the stop 21 has portions extending upwardly between the V belts. The stop 21 is supported for vertical movement in guides (not shown).

The cam 19, which is mounted on the main cam shaft 23, coacts with a follower 25 on a lever 26 attached to a shaft 27 carrying levers 28 attached by links 29 to the carriage 18. After the first arrested creamed sheet 14 has dropped on to the conveyor 20, the carriage 18 is returned to its original position, but it is periodically reciprocated by the cam 19 to allow further creamed wafer sheets to drop in succession on to the creamed wafer sheet situated at 14′. After the third creamed wafer sheet 14 has been fed up to the stop fingers 13, and during the short time interval before the carriage 18 is retracted the trays 11 are moved apart to allow the dry wafer sheet 12 to fall on top of the third creamed wafer sheet. Consequently the dry and creamed wafer sheets fall together, when the carriage 18 is retracted, on to the two creamed wafer sheets at position 14' to complete the sandwich. The stop 21 is then lowered to allow the completed sandwich to be moved on by the conveyor 20 which conducts it beneath a presser unit. The conveyors 15 and 20 are respectively driven by chains 42, 41 from a shaft 43, which, in turn, is driven by gears 43A, 43B (Fig. 2) from a shaft 43C driven by a chain drive from a sprocket 43D on the cam shaft 23. The roller 115 driving the conveyor 15 carries a sprocket 116 driven by the chain 42.

The trays 11 and the stop 21 are respectively actuated by cams 30, 31 on a subsidiary cam shaft 32, which is driven by a gear 132 meshing (though shown separated in Fig. 3) with a gear 24 on the cam shaft 23 and rotates at one third of the speed of the main cam shaft 23. The cam 30 coacts with a follower 33 on a lever 34 pivoted on a shaft 134 and coupled to the lower end of a rod 35 which, at its upper end, is pivoted to one of a pair of the aforesaid brackets 36 which are coupled together by a link 37. A spring maintains the follower 33 in contact with the cam 30. The cam 31 cooperates with a follower 38 on a lever 39, fixed to a shaft 40 carrying levers 44 supporting vertical bars 45 connected to the stop 21. Levers 144 pivoted on the shaft 134 support the lower ends of the bars 45.

As the main cam shaft 23 performs three revolutions per revolution of the subsidiary cam shaft 32, three creamed wafer sheets are incorporated into each sandwich. By varying the gear ratio provided by the gears 24, 132, so that the main cam shaft 23 performs one, two or four revolutions per revolution of the subsidiary cam shaft 32, the machine can be adjusted to produce sandwiches containing one, two or four creamed wafer sheets as the case may be. Corresponding adjustment of the selecting and marshalling unit is, of course, required as described in United States Patent No. 2,884,115 to provide appropriate variation in the timing of the arrival of the dry wafer sheets 12 at the sandwiching machine.

Preferably side guides are fitted alongside the conveyor 10 to prevent the dry wafers from falling off it and a pivoted support is provided for the rear edge of the dry wafer held by the trays 11, this support being moved aside by a cam (not shown) to allow the dry wafer to fall immediately after the trays 11 have moved apart to release the dry wafer.

Instead of using separate stops 13, 21 for arresting the wafers on the conveyors 15, 20, it is possible to use a single stop. Thus the stop 21 may be omitted and the stop 13 extended downwardly to an extent sufficient to enable it to arrest the wafers on the lower conveyor 20. In this case the cam 31 would be arranged to lift the single stop sufficiently to allow completed wafer sandwiches on the conveyor 20 to pass, the stop remaining effective, when lifted, to arrest wafer sheets on the upper conveyor 15. Provision may be made whereby the single stop may be swung aside manually, in the event of a "jam-up" of wafers in the machine, to facilitate clearance of the wafers.

It is also possible, as shown diagrammatically in Fig. 4, to replace the conveyors 15, 20 by a single conveyor, having its upper run at two different levels 15A, 15B. Fig. 4 also shows the machine provided with a single stop 13A of the construction just described which is effective to arrest wafers on both the upper and lower runs of the conveyor.

What I claim as my invention and desire to secure by Letters Patent is:

1. A machine for producing sandwiches consisting of layers of wafer sheets, biscuits or the like with intervening layers of cream or other filling material, comprising continuously travelling conveyor mechanism including upper and lower conveying sections, each of which serves to support and convey wafer sheets, said upper section having a delivery end overlapping said lower section, stop mechanism having vertically aligned upper and lower portions, the upper portion of the stop mechanism serving to arrest in succession creamed wafer sheets fed thereto, with their creamed surface uppermost, by the upper section of the conveyor mechanism, mechanism for periodically retracting the delivery end of the upper section of the conveyor mechanism to cause the arrested sheets to fall in succession on to the lower section thereof, the lower portion of the stop mechanism serving to arrest the sheets so deposited, means operative whenever a predetermined number of creamed sheets has been arrested by the upper portion of the stop mechanism to deposit a dry wafer sheet on top of the creamed sheets to form a sandwich, and means for thereafter withdrawing the lower portion of the stop mechanism to allow the lower section of the conveyor mechanism to feed the sandwich forward.

2. A machine according to claim 1, wherein the upper and lower sections of the conveyor mechanism are constituted by separate conveyors.

3. A machine according to claim 1, wherein the upper and lower sections of the conveyor mechanism are constituted by portions, at different levels, of the upper run of a single conveyor.

4. A machine according to claim 1, wherein the upper portion of the stop mechanism is constituted by a fixed stop and the lower portion by a separate movable stop.

5. A machine according to claim 1, wherein the stop mechanism is constituted by a single stop which can be periodically lifted to an extent sufficient only to allow of forward feed of the sandwiches on the lower section of the conveyor mechanism.

6. A machine according to claim 1, wherein the delivery end of the upper section of the conveyor mechanism is supported on a reciprocating carriage which is movable lengthwise of said section to shorten the length of its upper run and thereby allow the arrested creamed wafers to fall on to the lower section of the conveyor mechanism.

7. A machine according to claim 1, wherein the depositing means includes means for supporting dry wafer sheets in position above the arrested creamed sheets, a conveyor for supplying dry wafer sheets in succession to the supporting means and mechanism operative while the upper section of the conveyor mechanism is not retracted for moving the supporting means to an inoperative position to allow a dry wafer sheet to descend upon the last arrested creamed sheet.

8. A machine according to claim 7, wherein the retracting mechanism comprises a main cam shaft carrying a cam for periodically retracting the upper section of the conveyor mechanism, and which is further provided with a subsidiary cam shaft driven by interchangeable gearing from the main cam shaft and carrying cams for respectively disabling the supporting means and withdrawing the lower portion of the stop mechanism.

9. A machine according to claim 7, wherein the supporting means comprises trays for supporting the edges of the dry wafer sheet.

References Cited in the file of this patent

UNITED STATES PATENTS

| | | |
|---|---|---|
| 2,478,075 | Baker | Aug. 2, 1949 |
| 2,804,831 | Oakes | Sept. 3, 1957 |
| 2,838,010 | Farrer | June 10, 1958 |
| 2,881,900 | Packman et al. | Apr. 14, 1959 |

FOREIGN PATENTS

| | | |
|---|---|---|
| 160,285 | Australia | Dec. 16, 1954 |
| 777,268 | Great Britain | June 19, 1957 |